March 14, 1967 — M. A. KOSKELA — 3,309,017
EDUCATIONAL CALCULATING DEVICE
Filed June 4, 1965

INVENTOR.
Melvin A. Koskela
BY
John J. Kowalik
Attorney

3,309,017
EDUCATIONAL CALCULATING DEVICE
Melvin A. Koskela, 2600 N. Kimball Ave., Apt. 310, Chicago, Ill. 60647
Filed June 4, 1965, Ser. No. 461,459
1 Claim. (Cl. 235—78)

This invention relates to calculating devices and more specifically to a type which converts weight and cost of a product to utilizable common denominators for ready comparison by the user.

Current merchandising practices make it extremely difficult for the buyer to compare costs of different products or of the same product sold on the basis of different weight. Frequently it is laborious and time consuming to determine from a number of packaged products the actual price of each product. One product for example may be sold at 49¢ for 15 oz. and another at 59¢ for 17 oz. It is necessary to obtain a computation in a common denominator to obtain a rational solution.

It is a general object of the invention to provide a calculator of simple and efficient form which readily divides the total cost by the aggregate units and obtains an answer based upon a single unit of measure.

A more specific object of the invention is to provide a novel calculating device in which there are provided three concentric rings of numerals, the outer of which indicates the total cost, an intermediate ring which has a series of numerals indicating total weight and registrable with selected outer numerals and an inner ring with a corresponding unit cost.

Another broad object of the invention comprehends a computer which overcomes lengthy or complex computations when comparing prices on various competitive consumer goods, or prices on different size containers of the same product.

A further object of the invention is to provide a novel calculating device such as described in which the various movable members are made of inexpensive materials such as paper or nylon or some other plastic such as polyethylene, etc.

It is within the objectives of the invention to provide an accurate calculator in which the movable elements may be made of different electrostatically mutually attracted substances whereby the elements may be forcibly moved relatively and aligned accurately by the operator irrespective of the mechanical guides provided whereby the calculation will not be distorted due to wear of the parts.

Figure 1:
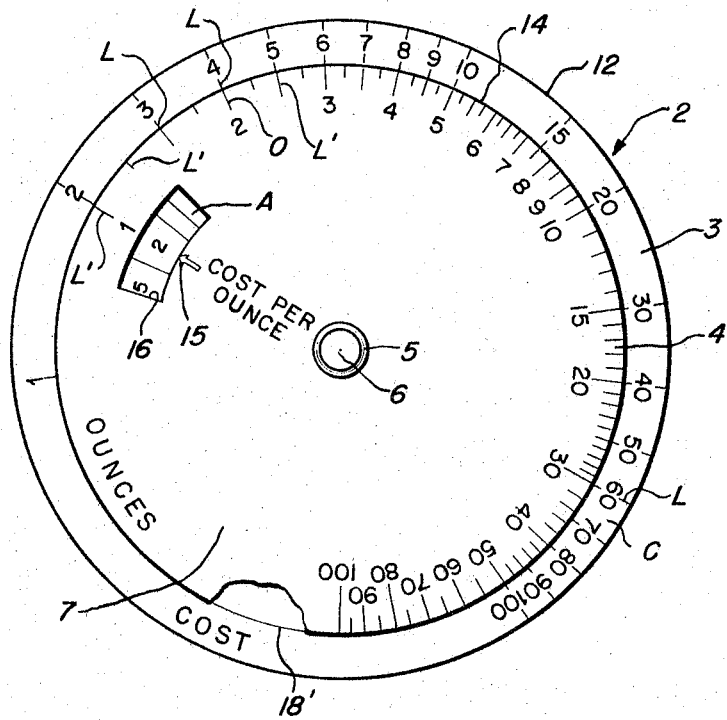
Figure 2:
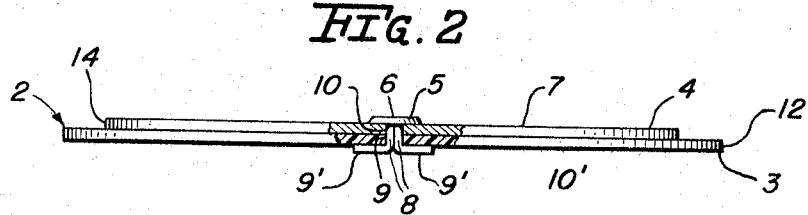
Figure 3:
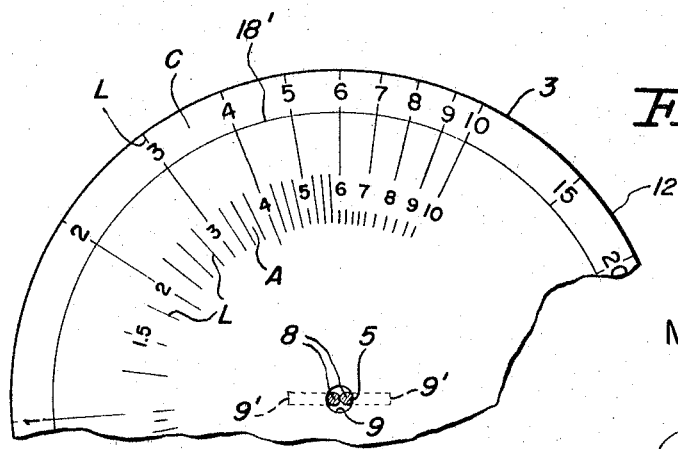

These and other objects and advantages inherent in and encompassed in the invention will become more readily apparent from the specifications and the drawings, wherein:

FIGURE 1 is a plan view of my novel computer;
FIGURE 2 is an edge view, and
FIGURE 3 is a plan view of the bottom disk.

Description of the invention

The preferred form of the invention is disclosed in the drawings and comprises a circular computer generally designated 2 which has a bottom disk 3 and an upper smaller disk 4. The disks are rotatably interconnected on their center axes by a pin 5 in the form of a cotter key having a head 6 engaging the outer face 7 of the top disk 4. The pin 5 has a pair of legs 8, 8 which extend through axially aligned openings 9, 10 in the centers of the disks 3 and 4. The legs 8, 8 are spread and have their lower end portions 9', 9' bent under the outer or bottom face 10' of the lower disk 3. The legs 8, 8 are rounded and tangentially engage the circular apertures 9, 10 in the disks as best seen in FIGURE 3.

The lower disk 3 has a numerical logarithmic inscribed thereon, the increments being designated by circumferentially separated appropriately arranged radial lines L. This scale generally indicated C designates cost in currency such as dollars. This scale C is arranged in an annular form inwardly of the outer circular periphery 12 of the lower disk.

The upper disk has an outer annular peripheral edge 14 which is disposed inwardly of the scale C and has a scale O inscribed thereon in a logarithmic pattern corresponding to the scale C and having increments designated by the radial circumferentially spaced lines L'. The scale O designates the units of weight such as for example ounces or pounds. Thus it will be seen that setting the scale O so that the numerals 1 through 100 respectively match with the units 1 through 100 on the outer scale C, the answer for unit cost in each instance is 1 as represented by the scale A for answer. The scale A is inscribed upon the lower disk in an annular logarithmic pattern radially inwardly of the intermediate scale O. Scale A is readable against a pointer 15 formed on upper disk 4 and projecting into a window 16 in disk 3. The window 16 registers with the scale A.

Thus for example if a product sells for 16¢ for 8 oz. the scale O is set with the mark or line 8 radially aligned with the mark 16 and reading in the window the index line 15 designates the answer as "2."

It will be realized that in computers such as herein shown and described, accuracy demands that the pivot be accurate and that the increments also be accurate. In order to make an inexpensive unit I provide a register circle 18' on the lower disk which is of a size closely approximating the peripheral edge 14. Thus the upper and lower disks are alignable in concentric relation irrespective of any wear occurring at the pivot openings. General take up of wear is taken up by spreading the legs of the pin.

Inasmuch as the accuracy of the instrument is determined by correct alignment of the disks, the accurate alignment is obtained by matching the edge 14 with the register circle 18'. The disks are held in selected calculating position by electrostatic attraction which is developed between the plastic disk 3 and the paper or cardboard disk 4. The electrostatic charges are developed due to friction and the plastic disk may be stroked with a wool cloth. A piece of such cloth may, if desired, be adhered to the paper disk so that as the two disks are rotated the charges develop. Thus even though the pivots may be loose, the disks may be properly aligned and temporarily held in precisely set positions until the user makes his reading whereupon the disks are again forcibly movable for a new calculation.

Thus a novel, simple and effective educational and useful calculating device has been provided which gives accurate and immediate answers.

It will be realized that the foregoing discloses a preferred form of the invention and is not intended to limit this invention and that the scope thereof is as set forth in the appended claim.

I claim:

An educational computing device for establishing unit costs of items in relation to their total price and weights of several comparable items, upper and lower relatively rotatable electrostatically charged disks having temporary adherence to each other, at least one disk being made of plastic, the other of said disks being made of paper, each disk having a peripheral edge and a set of numbered graduations adjacent said edges registrable with each other, the graduations on one disk representing units of measure and the graduations on the other disk representing total cost of an item, indicia on said disks registrable to indicate cost per unit of measure in answer to selected alignment of said graduations on one disk with respect to the other, and register means on both disks alignable with each other to hold the disks in accurate relationship with each other and held in such registry pursuant to said electrostatic charges adhering said disks whereby the graduations on said disks may be accurately aligned to obtain correct readings and pivot means rotatably securing said disks to each other and having an axial portion extending through apertures in the disks and having a round outer periphery in complementary engagement with the edges of said apertures and having means at opposite ends of said axial portion biasing said disks axially into engaged position.

References Cited by the Examiner

UNITED STATES PATENTS

| | | | |
|---|---|---|---|
| 1,023,961 | 4/1912 | Quivey | 235—84 X |
| 1,150,228 | 8/1915 | Sargent | 235—84 |
| 1,429,264 | 9/1922 | Wright | 235—84 |
| 1,507,333 | 9/1924 | Carroll | 235—84 |
| 1,555,575 | 9/1925 | Hogsten et al. | 235—84 |
| 2,674,410 | 4/1954 | Bernstein | 235—88 |
| 2,698,716 | 1/1955 | Singer | 235—88 |
| 2,793,809 | 5/1957 | Crowe | 235—88 |
| 3,076,596 | 2/1963 | Jaderholm | 235—84 |
| 3,181,787 | 5/1965 | Burns | 235—78 |

FOREIGN PATENTS 968,377   11/1950   France.

OTHER REFERENCES

Products: What's Newest . . . Supermarket Slide Rule, Newsweek, July 31, 1961, page 63.

STEPHEN J. TOMSKY, *Primary Examiner*.

LEO SMILOW, LOUIS J. CAPOZI, RICHARD B. WILKINSON, *Examiners*.

C. G. COVELL, J. G. MURRAY, *Assistant Examiners*.